3,303,818
METHOD OF FREEING PIGS FROM SICKNESSES WHICH ARE TRANSFERRED TO THE PIGLETS FROM THE MOTHER SOW
Heinrich Biehl, Witzhave, near Trittau, Germany
No Drawing. Filed July 26, 1965, Ser. No. 474,937
Claims priority, application Germany, Dec. 21, 1964, B 79,833
5 Claims. (Cl. 119—1)

The invention relates to a method of freeing pigs from sicknesses which are transferred to the piglet from the mother sow, in particular, from piglets influenza (pig virus pneumonia) and from the sniffing sickness (atrophitic rhinitis).

It has been found that the piglets influenza (pig virus pneumonia) which is very often inflicted on pigs, and the sniffing sickness (atrophitic rhinitis) are not, as has been assumed so far, caused by some want or are even inherited sicknesses, but that these sicknesses are infectious sicknesses (the morbific agent has not been isolated up to this day) which are transferred to the piglet from the mother sow. Mother sows may cause such sicknesses without being recognized themselves as sick animals.

During these examinations, it was found that mother sows having the sniffing sickness, in general, also had sick lungs and transferred to the piglets not only the morbific agents of the atrophitic rhinitis but also the morbific agents of the infectious piglet influenza (pig virus pneumonia).

All attempts to fight these sicknesses by means of medicines have not been successful so far. Nor was it possible to develop a vaccination substance to keep these sicknesses to a minimum. Under these circumstances, it is not surprising that both sicknesses have more and more spread among the pigs all over the world. In the Netherlands, the atrophitic rhinitis has been a sickness liable to be reported for the last few years. It is being attempted to prevent further spreading of both sicknesses by emergency slaughtering of the livestock of pigs. Even in Denmark, the traditional pig rearing country, the infection of the livestocks of pigs by both sicknesses has made considerable progress. It is estimated by experts that about 70% of all the livestocks of pigs are infected by atrophitic rhinitis and pig virus pneumonia.

In the United States one has adopted the practice of attacking these sicknesses with the aid of special stations. At the present time, there are about 90 such stations in existence in the United States. Also in England and in Switzerland, one has meanwhile adopted the practice of establishing such stations.

These stations are working about in the following manner: A farmer who is desirous of restoring the health of his livestock of pigs, hands his mother sows over to the station shorty before confinement and, in the meantime, sells his old stock of animals or kills them. In the station, the sow will then be sacrificed (no use can be made of her any more) and the piglets are reared as described above. After 6 weeks, the farmer may receive his piglets. When it is to be secured that with this the atrophitic rhinitis and the pig virus pneumonia are really extirpated, the farmer will in the future have to observe many regulations given to him by the station. This include above all that he will as a rule have to carry out disinfections very often and avoid visits by strangers. Even the person in attendance of the pigs is allowed to enter the farm only through a lock after having put on sterile clothes before.

The costs for the erection of such a station of a medium size are, however, very high and are amounting to about 1 mill. D-marks (1 million German marks). Correspondingly, a piglet when leaving the station at an age of 6 weeks costs about DM 300 (300 German marks).

Nevertheless, it has been decided to erect such stations in the extent as indicated above because it has been found meanwhile that pigs that have been reared in a good state of health are achieving an increase in pork production of about 20% as compared with average animals reared in the country. Reduced mortality and reduced susceptibility to sicknesses are constituting further advantages.

The present invention is devoted to the problem of providing a method to free livestocks of pigs from sicknesses transferred to the piglet from the mother sow, especially piglets influenza (pig virus pneumonia) and sniffing sickness (atrophitic rhinitis), which is inexpensive and, owing to the low costs involved, is especially well suited for general introduction.

In accordance with the invention, the problem is solved in that the piglets are weaned from the mother sow a few days after their birth, removed from her and kept and fed separate from one another up to an age of several weeks, whereupon a usual keeping and feeding of the piglets is taken up, that the piglets which appear to be suited for further breeding are selected from among these piglets and are admitted for further breeding, and in that the mother sows which have been selected in this manner are then slaughtered after having had piglets for the first time and are examined especially by examination of the contents of the nose and lungs to find out whether they were suffering from the specific sicknesses, and in that the piglets from this mother sow are admitted for breeding purposes only if the examination has furnished proof that the mother sow was free of these specific sicknesses. In this manner, the livestock of pigs may be freed from those sicknesses which are transferred to the piglets from the mother sow, on the broadest possible basis and with little expense.

At first, the danger of infection of the newly born animal during the time it is with the mother sow is reduced. During the first 48 hours, the piglets gets a natural protection from the anti-bodies which are contained in the colostral milk. It is assumed that this protection will last for about 8 days. If it must be expected that the morbific agents of the atrophitic rhinitis and also of the pig virus pneumonia have been transferred to the piglet during the first 4 days, it is possible by selection of those animals which showed the best development in the individual rearing station, to achieve an additional security for breeding. It may be assumed that, if the best female animals which are of the same age are selected at an age of 28 to 35 days and, in this selection, no more than 5% of the animals of the same age are taken at a time, these will be absolutely healthy animals which are, above all, not infected with the two sicknesses.

This probability is made into certainty in that the animals selected for breeding in the manner described above are slaughtered after they have had their piglets and thereupon are carefully examined whether one of these animals possibly had caught one of the said sicknesses in spite of all precautions. Naturally, this examination has to be directed above all to the contents of the nose and the lungs of the animals. In case it is found that the mother sow was sick, in spite of all precautions, the piglets of this mother sow will be excluded from breeding and are free of specific morbific agents.

A considerable advantage of this procedure consists in that the slaughtered mother sow may be made use of without any restriction so that no disadvantages are caused to the person keeping the animals.

The separation of the piglets are described above which, to a considerable extent, will already bring about freedom of these piglets from the specific morbific agents, still brings about additional advantages. The separation proper may be carried out especially by means of the devices covered by the older patent application No. 340,008 of January 24, 1964. Such a separation offers the advantage that the costs of a weaned piglet may substantially be reduced (about 35-40%) as compared with the costs caused by a piglet of the same age with conventional rearing.

The premature weaning of the piglet from the mother sow results into a more frequent admission of the mother sow and in a substantial reduction of feed costs for the mother sow because it need not give away any food to the piglets. While, with conventional rearing the annual feed costs for the mother sow are mounting to about DM 550, they are amounting to only DM 300 if the piglets are weaned from the mother sow at an age of 4–5 days. With conventional rearing, a mother sow may rear 15–16 piglets per annum; in this case, the primordial feed cost charge per piglet alone is about DM 36. With premature weaning a mother sow may produce 25–30 piglets per annum without any detrimental effects being caused thereby to her health. In this case, the primordial feed cost charge per piglet only is about DM 10 to DM 12. The feed costs which are caused by the piglet in a single cage must be lower than those caused by a piglet fed by the mother sow; namely, before the food is taken by the piglet from the sow with conventional rearing, an energy conversion which is connected with losses has taken place within the mother sow. Further factors adding to a reduction in costs are: the reduction in labour caused by a piglet kept and fed in a cage, and the reduction in the risk, both in comparison with conventional rearing.

What has an especially advantageous effect is the circumstance that the observation of the individual piglets is facilitated by accommodation in single cages so that it is also possible to pass safer judgment as to whether the animal may be selected for further breeding or not.

Suitably, the piglets after having been singled, will be reared in special individual rearing stations. These individual rearing stations are taking over the piglets from the farmer at an age of say 4 days and are taking over the further rearing against payment up to an age of say four to five weeks. The individual rearing station being an independent enterprise, may, however, also buy the piglets from the farmer at an age of say 4 days. If a farmer then is desirous of effecting further pork production on his farm, the rearing station will sell him healthy animals for pork production or also for breeding purposes of an age of about four to six weeks and more. Such an individual rearing station may for instance have an annual capacity of 20,000 piglets so that these stations may be attended by only two persons. The cost charge per piglet might under these circumstances be kept very low. One obtains in this manner not only a safe expulsion of the specific sicknesses which are transferred to the piglets from the mother sow, from all livestocks of pigs in the shortest possible time but also obtains additional advantages which consist in that (1) the farmer is spared the time consuming labour of rearing the piglets, (2) the risk involved in the rearing is taken over by the station from the fourth day of life on which, owing to its equipment, is in a position to keep the mortality low, (3) the costs for feed and proportionate other costs are lower than with conventional rearing, (4) the animals coming from the station are healthier than the average animals with conventional rearing, (5) the future pork production is favourably influenced because of the better condition and, thus, the degree of feed evaluation is improved.

What I claim is:

1. The method of selecting animals for breeding purposes to prevent the transfer of contagious diseases from the mother to the offspring comprising the steps of weaning the offspring a few days after birth and separating the offspring from the mother, separating the offspring from one another and feeding and raising the offspring until several weeks of age, feeding and raising the offspring in a normal manner to a sufficient age to permit selection for breeding purposes, selecting those offspring which appear best suited for breeding purposes and breeding them, slaughtering said bred offspring upon their giving birth to their first brood, examining said slaughtered offspring for contagious disease, and raising for breeding purposes only those animals of said first brood born to said slaughtered offspring free of contagious disease.

2. The method of selecting animals for breeding purposes to prevent the transfer of certain contagious diseases from the mother to the offspring comprising the steps of weaning the offspring a few days after birth during the period the offspring retain their natural postbirth immunity to infectious disease and separating the offspring from the mother, separating the offspring from one another, and feeding and raising the offspring until several weeks of age, feeding and raising the offspring in a normal manner to a sufficient age to permit selection for breeding purposes, selecting those offspring which appear best suited for breeding purposes and breeding them, slaughtering said bred offspring upon their giving birth to their first brood, examining said slaughtered offspring for said certain contagious disease, and raising for breeding purposes only those animals of said first brood born to said slaughtered offspring free of said certain contagious disease.

3. The method of selecting piglets for breeding purposes to prevent the transfer of particular, contagious diseases from the mother sow to its newborn piglets comprising the steps of weaning piglets from the mother sow a few days after birth, separating the piglets from the mother sow, separating the piglets from one another and feeding and raising the piglets until several weeks of age, thereupon feeding and raising the piglets in a normal manner to a sufficient age to permit selection for breeding, selecting those matured pigs which appear best suited for breeding purposes and breeding them, slaughtering the bred matured pigs upon their giving birth to their first brood of newborn piglets, examining said slaughtered pigs for said particular disease, and raising for breeding purposes only those newborn piglets from slaughtered pigs free of said particular disease.

4. The method of selecting piglets for breeding purposes to prevent the transfer of particular, contagious diseases from the mother sow to its newborn piglets comprising the steps of weaning piglets from the mother sow a few days after birth during the period said piglets retain their natural postbirth immunity to infectious disease, separating the piglets from the mother sow, separating the piglets from one another and feeding and raising the piglets until several weeks of age, thereupon feeding and raising the piglets in a normal manner to a sufficient age to permit selection for breeding, selecting those matured pigs which appear best suited for breeding purposes and breeding them, slaughtering the bred matured pigs upon their giving birth to their first brood of newborn piglets, examining said slaughtered pigs for said particular disease, and raising for breeding purposes only those newborn piglets from slaughtered pigs free of said particular disease.

5. The method of selecting piglets for breeding purposes to prevent the transfer of particular, contagious diseases comprising the steps of slaughtering the mother sow upon giving birth to its first brood of piglets, examining the slaughtered mother sow for the presence of said particular, contagious disease, and raising for breeding purposes only those newborn piglets born to slaughtered sows free of said particular, contagious diseases.

References Cited by the Examiner

UNITED STATES PATENTS

| | | | |
|---|---|---|---|
| 2,604,874 | 7/1952 | Forbes et al. | 119—15 |
| 2,661,800 | 12/1953 | Reichenbach | 119—18 |
| 2,703,570 | 3/1955 | Young | 128—1 |
| 2,881,733 | 4/1959 | Young et al. | 119—15 |

SAMUEL KOREN, *Primary Examiner.*

ALDRICH F. MEDBERY, *Examiner.*